United States Patent

[11] 3,604,307

| [72] | Inventor | Anthony J. Vono<br>115 Parhurst Rd, Warwick, R.I. 02889 |
|---|---|---|
| [21] | Appl. No. | 48,052 |
| [22] | Filed | June 22, 1970 |
| [45] | Patented | Sept. 14, 1971 |

[54] DRUM TEACHING AID
10 Claims, 5 Drawing Figs.

[52] U.S. Cl. ................................................ 84/465,
272/67
[51] Int. Cl. ...................................................... G09b 15/06
[50] Field of Search........................................... 84/411,
465, 467, 468, 469, 470, 453; 272/67

[56] References Cited
UNITED STATES PATENTS

| 591,800 | 10/1897 | Finnblade et al. ............ | 84/469 |
| 3,443,471 | 5/1969 | Muzio ........................... | 84/465 |

Primary Examiner—Richard B. Wilkinson
Assistant Examiner—John F. Gonzales
Attorney—Max Schwartz ABSTRACT: In teaching a pupil to drum, one of the most difficult things is the correct position of the left arm and hand and the maintaining of this position. The device comprises an elongated support which can be clamped to one leg of the stool or chair on which the pupil sits. The support extends outwardly in the form of a metal tube in spaced parallel relation to the correct position of the arm. Clamped along the tube in adjustable position are a pair of members which form an adjustable opening through which the arm extends loosely. In view of the different sizes of people and the different lengths of their arms, adjustment must be made for the position of the two members and for their size. The bottom portion of each guide member is resiliently closed by a springlike member which permits the arm to be dropped out and to be readily moved upwardly into the guide. The pupil need pay no attention to the position of the arm, but can feel the arm touching the sides of the guides when the arm moves out of correct position.

Inventor,
Anthony J. Vono,
by Max Schwartz
Att'y.

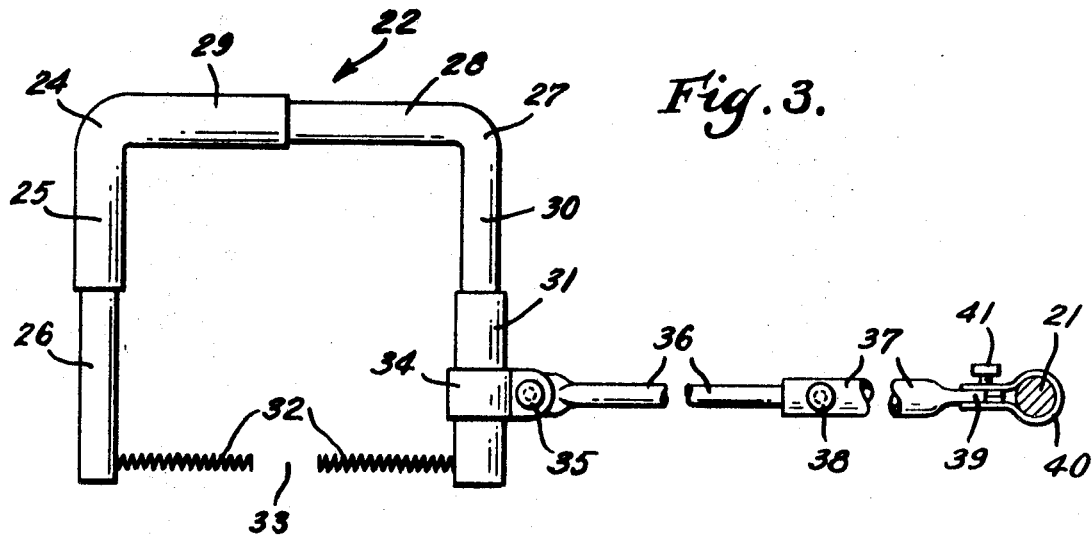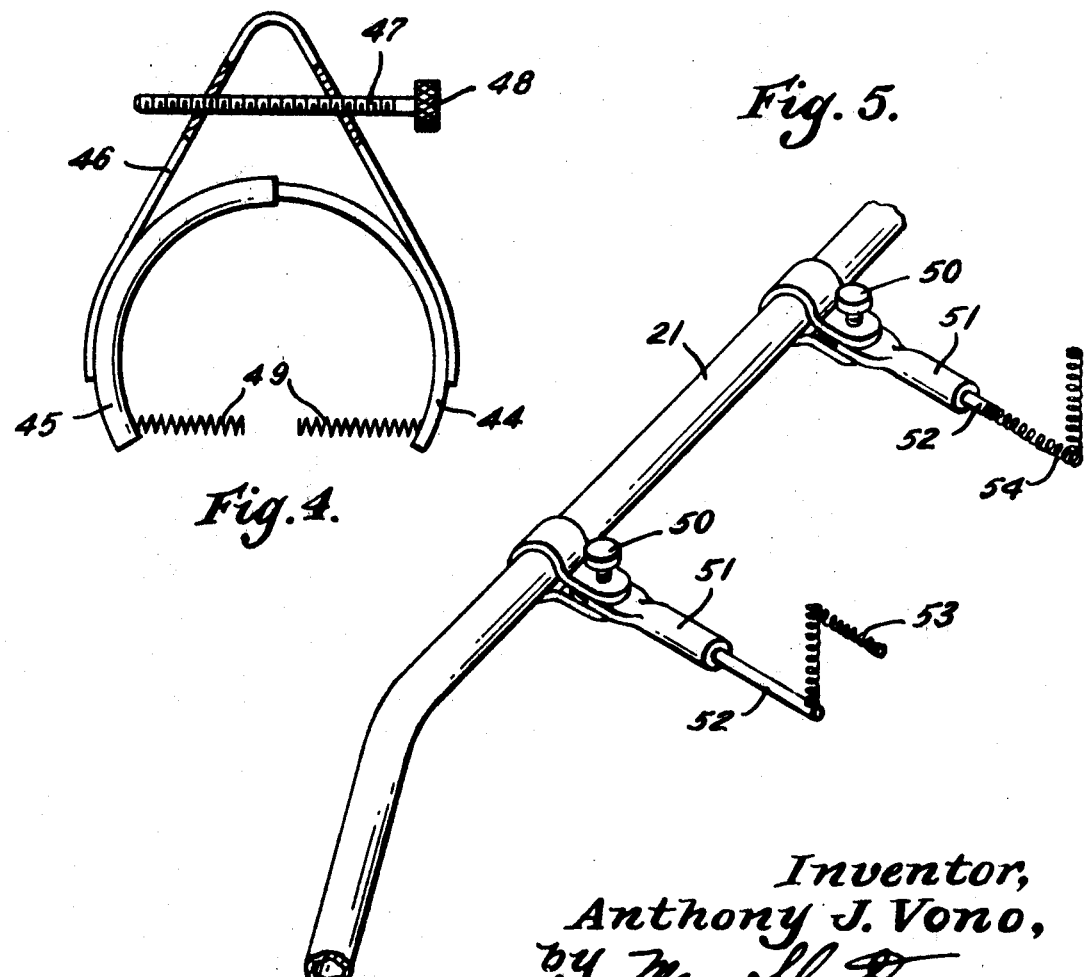

DRUM TEACHING AID

My present invention relates to a teaching aid, and more particularly to a novel construction of a drum teaching aid.

The principal object of the present invention is to provide a device for assisting the teacher in maintaining the correct position of the left arm of a drum student.

Another object of the present invention is to provide a teaching aid which forms a guide for the left arm to help the student maintain the correct position of the arm.

A further object of the present invention is to provide a teaching aid having a pair of guide members for the student's arm which are adjustable both for size and position. Another object of the present invention is to provide a teaching aid which maintains the correct position of the left arm and ultimately leads to the strengthening of the arm for skillful use.

A further object of the present invention is to provide a drum teaching aid which is simple in construction and easy and economical to manufacture and assemble.

With the above and other objects and advantageous features in view, my invention consists of a novel arrangement of parts more fully disclosed in the detailed description following, in conjunction with the accompanying drawings, and more particularly defined in the appended claims.

In the drawings:

FIG. 3 is an enlarged section taken on line 3—3 on FIG. 2;

FIG. 4 is a front view of another form of guide member;

FIG. 5 is a perspective view of still another form of guide member.

In teaching a student how to drum, one of the most difficult things is the correct position of the left hand and arm. The arm must be extended with the elbow away from the side of the body. In addition, the drumstick is held so that it extends from between the fingers out of the palm of the hand. This requires that the left hand be turned counterclockwise twisting the wrist and lifting the front end of the drumstick. To obtain a proficient left arm and hand, the elbow must remain in a relatively fixed position, away from the side of the body. The extended arm must remain in a relatively parallel position to the left side of the conventional chair seat, and also parallel to the floor. With the drumstick held in position, the student turns his wrist counterclockwise to bring the drumstick to an almost unattainable vertical position. The muscles responsible for the proficient development of the left arm will then become exercised and strengthened; in particular, the forearm muscles.

The present invention therefore provides a teaching aid in the form of a guide member through which the pupil extends the left arm. The guide member is positioned so that the arm passes loosely through a pair of guides. Now the pupil need not pay attention to the position of the arm unless he feels the sides of a guide, in which case he knows that his arm is moving out of position. Furthermore, I have provided a height indicator so that the pupil will know how high he is moving the tip of his drumstick. Adjustments must be made for the length and thickness of the pupil's arm and the device must be easy to use. This means that it must be easy for the pupil to insert and remove his arm from the guide.

Figure 1:
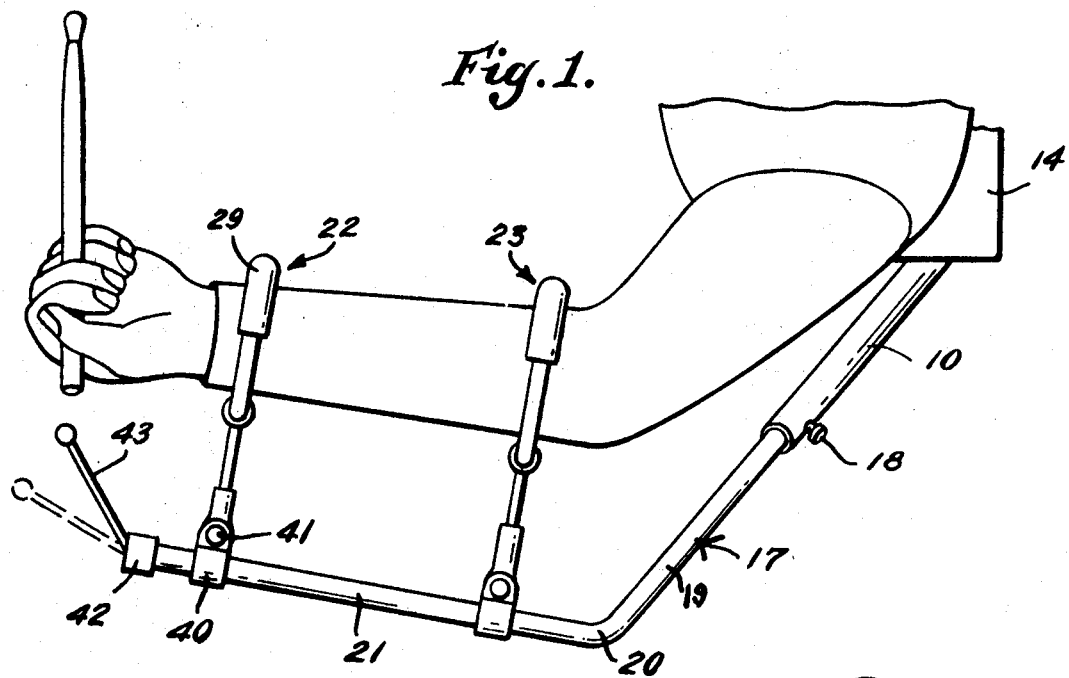
FIG. 1 is a top plan view of a drum teaching aid embodying my present invention.
Figure 2:
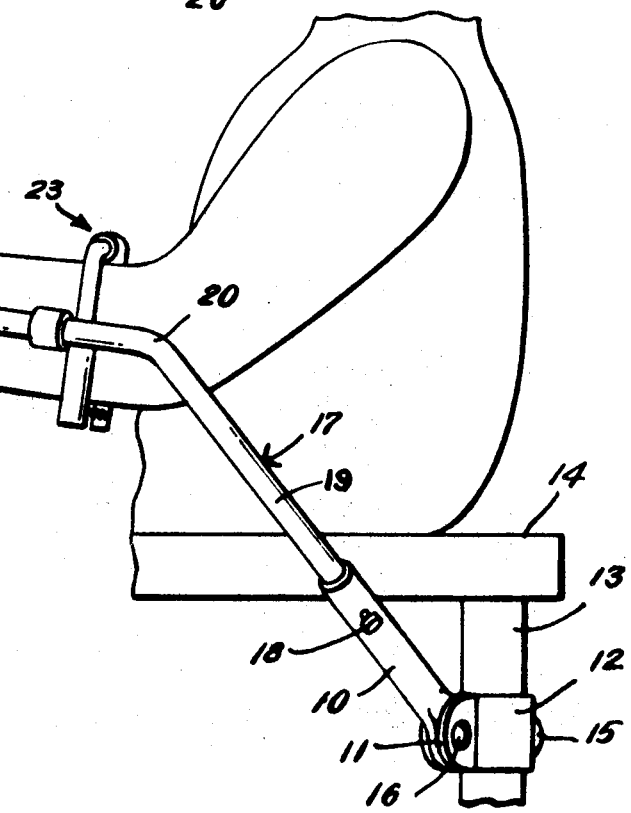
FIG. 2 is a side elevation of the same.

Referring more in detail to the drawings, FIGS. 1, 2 and 3 illustrate one form of my invention. It is contemplated that the device use aluminum, plastic, or thin stainless steel tubing, which is extremely light and strong. A short hollow supporting tube 10 is pivotally mounted at 11 to a clamp 12 which can be placed around the rear left leg 13 of a chair 14. A wing bolt 15 extends through the clamp 12 opposite the pivot 11 for tightening to the chair leg. Furthermore, a screw or wing bolt 16 extends through the pivot 11 for tightening the member 10 at the selected angle. An elongated supporting rod 17 is mounted in the tubular holder 10 and can be adjustably locked therein by the bolt 18. The support 17 has an extended portion 19 which is extended outwardly, see FIG. 2, to the correct outer position away from the body, and then is bent at 20, terminating in a straight portion 21 parallel to the correct position of the pupil's forearm.

I now provide a pair of guide members 22 and 23 for guiding the forearm in the correct position. The guide members are identical except that the guide member 22 is adjusted to a smaller opening than the guide member 23 because the arm is thicker at the point 23 than at 22. Now referring to FIG. 3, each guide member comprises a tubular angular member 24 having a vertical leg 25 in which the vertical arm portion 26 is frictionally slidable. Another L-shaped member 27 is provided with a horizontal leg 28 which is frictionally slidable into the tubular horizontal leg 29 of the member 24. Finally, the vertical leg 30 of the angular member 27 is slidable into a vertical tubular member 31. This provides a generally rectangular construction with an open bottom. The vertical height is adjustable by sliding the member 26 into the vertical tubular portion 25 and sliding the vertical portion 30 into the vertical tubular position 31. Horizontal adjustment can be made by sliding the horizontal portion 28 into the horizontal tubular portion 29. Thus the area encompassed by the three walls can be adjusted by increasing or decreasing the size of the opening.

The size of the opening should be such that the arm will generally loosely fit into it without touching the sides. The bottom wall is closed by a pair of spring arms 32 which can be formed of heavy coil tightly wound spring wire, one anchored at one end through the end of the member 26 and one anchored at the other end to the end of the member 31 so that they extend towards each other but leave a gap 33 therebetween. This permits the arm to be moved upwardly and inserted through the gap 33, the members 32 flexing to permit the insertion. Conversely, the arm can be dropped out of the guide 22 by moving it downwardly against the spring portions 32 through the gap 33.

Each person's arm is a different length and the person sits at a different height so that the position of the guide members 22 and 23 must be adjustable along the support 21 and also for height. This is provided by the support illustrated in FIGS. 1 and 3. A clamp 34 surrounds the tube 31 and is pivotally mounted at 35 to the supporting arm or rod 36. The pivot point at 35 can be tightened by means of a bolt in the conventional manner. The supporting rod 36 extends into a tubular socket 37 where it can be slidably adjusted and locked in position by means of the bolt 38. The tubular socket 37 is pivotally mounted at 39 to a clamp 40 surrounding a supporting member 21. The pivot point 39 is also locked by tightening the clamp 40 with the bolt 41.

With the above construction the holder 10 is locked to the rear left leg 13 of the chair 14 by the clamp 12. Its angular adjustment is made at 16 and the member 17 is now adjusted and locked in place by the bolt 18. The pupil's arm is placed in the correct position and through the two guide members 22 and 23. The teacher moves the guide members along the holding member 21 to the correct position shown in FIGS. 1 and 2 and locks them in position. The guides 22 and 23 are then adjusted to the correct size for the pupil and the device is ready for use. The pupil can now concentrate on the twist of his hand and the drum beat, and need not worry about the position of his arm until he feels his arm touching the sides of the guide members 22 and 23. He can then move his arm away from his side back to the correct position. To assist the pupil in knowing just how he has progressed in the height of the drumstick as shown in FIG. 1, the end of the supporting member 21 can be provided with a pivoted support 42 on which a rod 43 is pivotally mounted. The Instructor can move the rod 43 to the height to which the tip of the drumstick has been raised so that the pupil has a visual sight on the amount of twist that he has given his wrist. As his exercise and training progresses, the arm 43 will be raised higher and higher.

FIG. 4 illustrates an alternative form of guide which can be used in place of the guides 22 and 23. In this form I provide a pair of arcuate members 44 and 45, the member 45 being hollow and the member 44 being slidable into it. An inverted V- shaped strap 46 extends downwardly and is attached to the members 44 and 45. An elongated bolt 47 having a knurled head 48 extends through the arms of the member 46 so that turning movement of the bolt 47 will cause the arms to move toward or away from each other depending on the direction of rotation. This will cause the member 44 to slide into or out of the member 45, reducing or enlarging the area between them. The bottom of the members 44 and 45 is closed by the spring arms 49 which are similar to the arms 32 in FIG. 3.

Another alternative construction is shown in FIG. 5. The supporting member 21 is provided with adjustment clamps 50 to which the tubular sockets 51 are pivotally mounted. Frictionally mounted in each tubular socket is a supporting rod 52 which can be moved into and out of the socket 51. The supporting rod 52 is provided with an L-shaped member 53 at one end and 54 at the other end. The members 53 and 54 may be of a coil spring construction. The member 53 is provided with a vertical member extending from the support 52 and then a horizontal portion. The member 54 is provided with a horizontal member and then a vertical portion. This permits the arm to be positioned under the member 53 and over the member 54 into the correct position. This is not a complete guide, but is much cheaper to make than the original one.

Although the present description emphasizes the guiding of the left hand and arm, the device can also be used for the right hand and arm. Most people are right handed and their right arms are strong and they do not require the twisting wrist action on the right side due to the manner in which the right drumstick is held.

In any event I have provided adjustable means for guiding the arm of the pupil during the drumming. This permits the pupil to practice without the teacher with his arm kept in correct position. Other advantages of the present invention will be readily apparent to a person skilled in the art.

I claim:

1. A drum teaching aid comprising a support, means for mounting said support on a chair leg, an elongated rod extending from said support in spaced parallel relation to an arm of a drummer seated on the chair, and spaced guides mounted on said rod for guiding the drummer's arm, whereby the drummer's arm is passed through said guides to maintain the arm in correct drumming position.

2. A drum teaching aid as in claim 1, wherein said rod is adjustably mounted in said support.

3. A drum teaching aid as in claim 1, wherein said guides are adjustably mounted along said rod.

4. A drum teaching aid as in claim 2, wherein said guides are adjustably mounted along said rod.

5. A drum teaching aid as in claim 1, wherein said guides are adjustable for the size of the arm.

6. A drum teaching aid as in claim 3, wherein said guides are adjustable for the size of the arm.

7. A drum teaching aid as in claim 4, wherein said guides are adjustable for the size of the arm.

8. A drum teaching aid as in claim 5, wherein said guides comprise telescopically mounted members for reducing or enlarging the area through which the arm passes.

9. A drum teaching aid as in claim 1, wherein the bottom portion of each guide member is resiliently closed by a pair of coil springs extending toward each other.

10. A drum teaching aid as in claim 8, wherein the bottom portion of each guide member is resiliently closed by a pair of coil springs extending toward each other.